No. 787,696. PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 1.
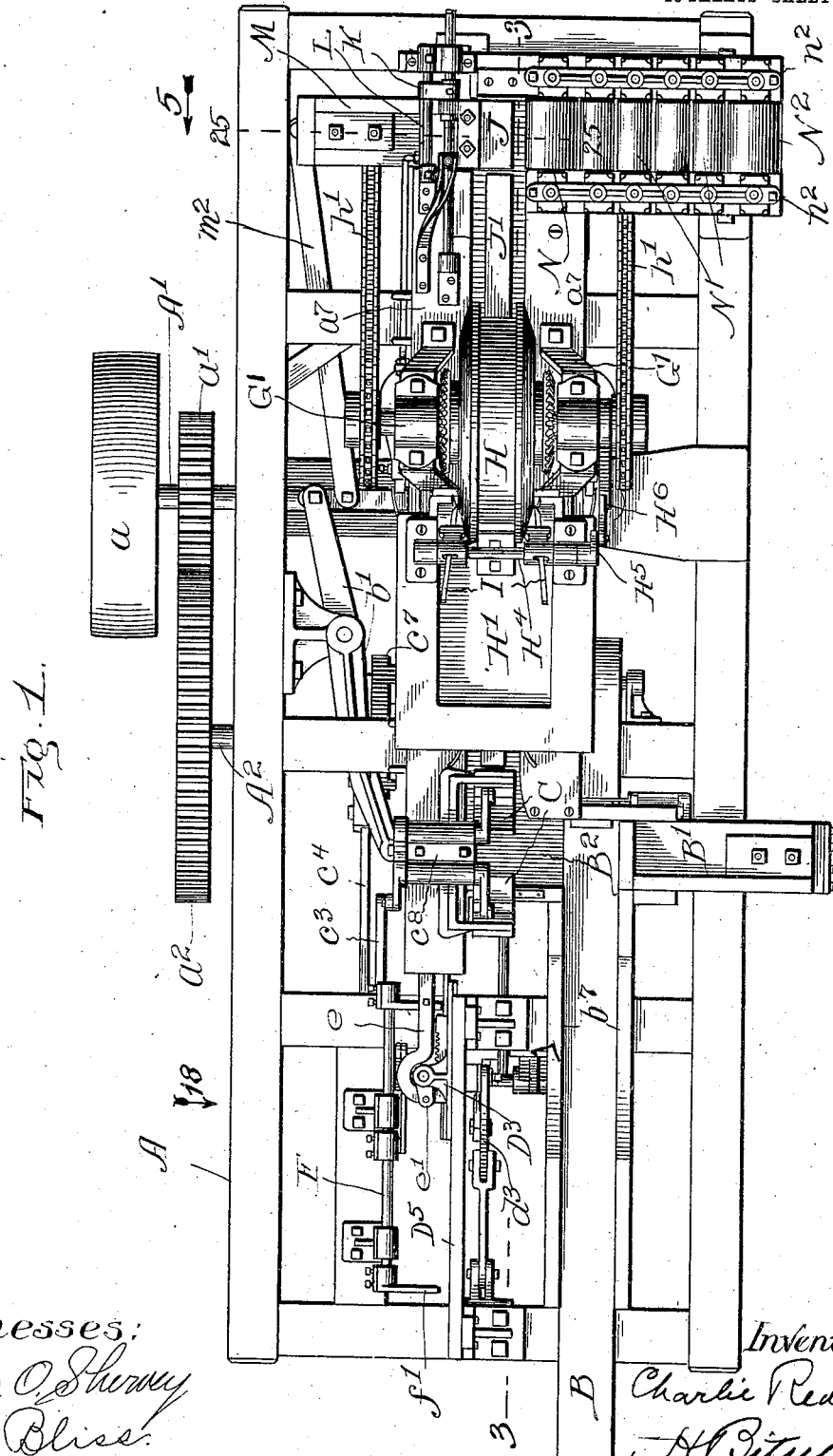

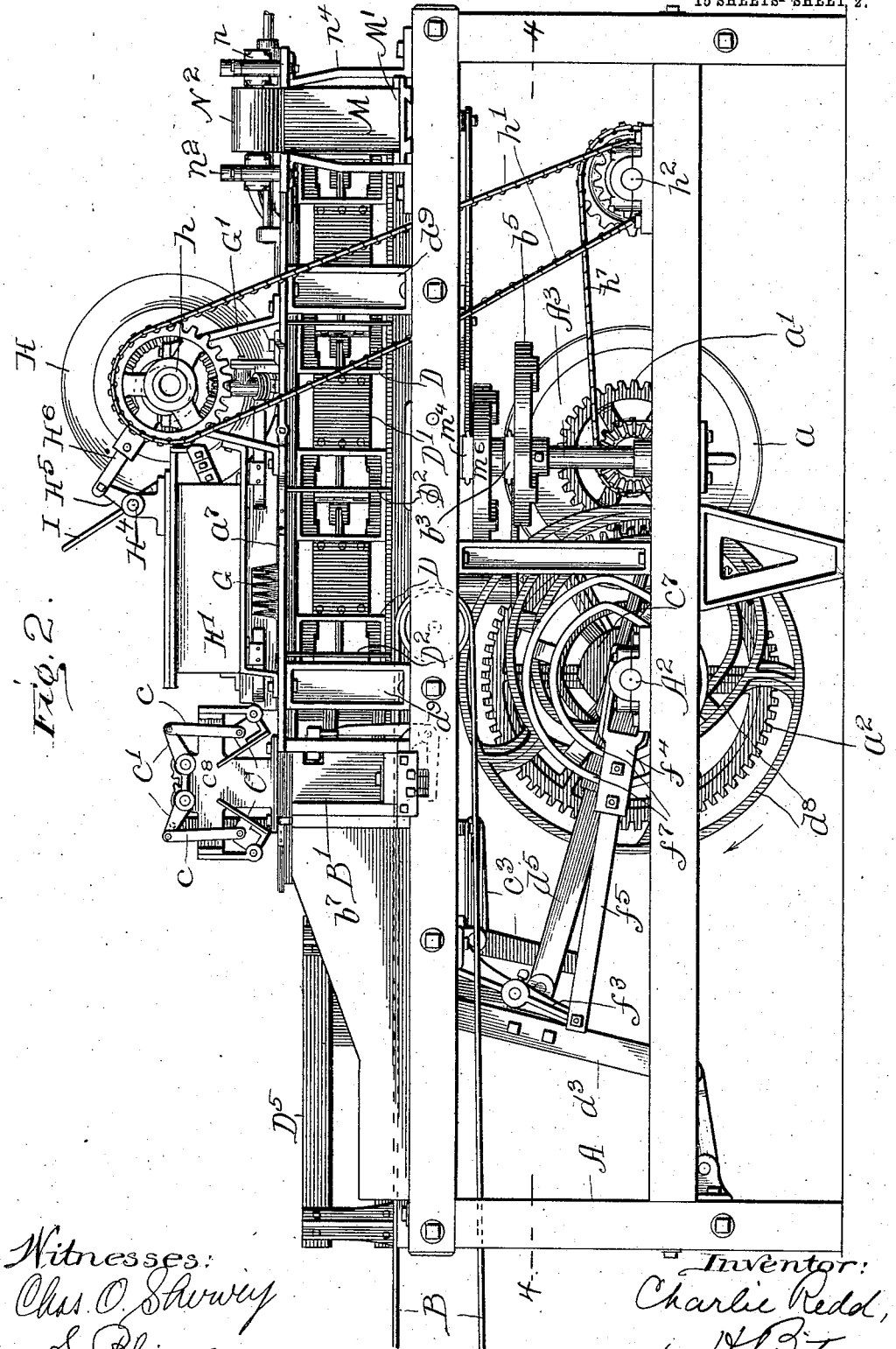

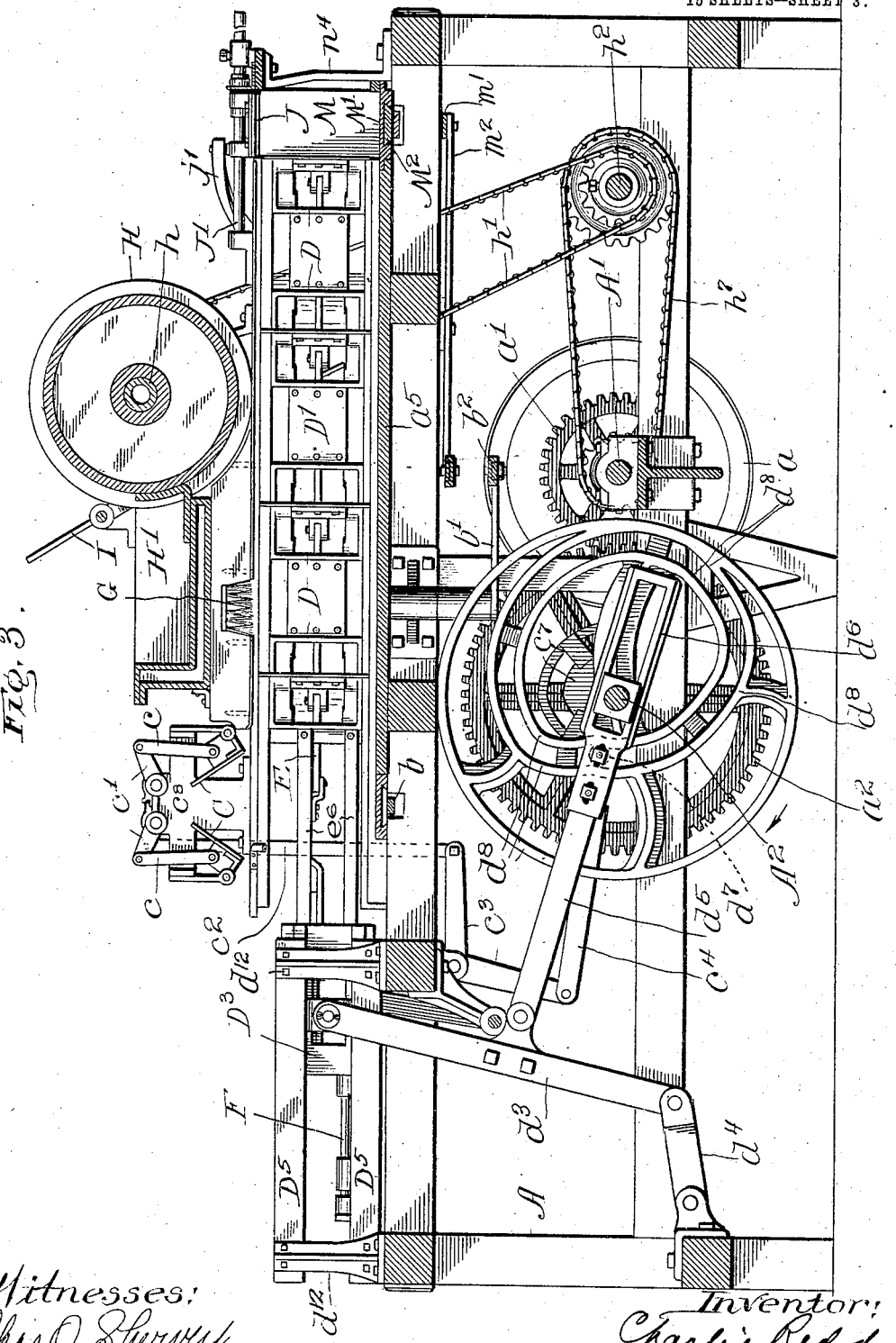

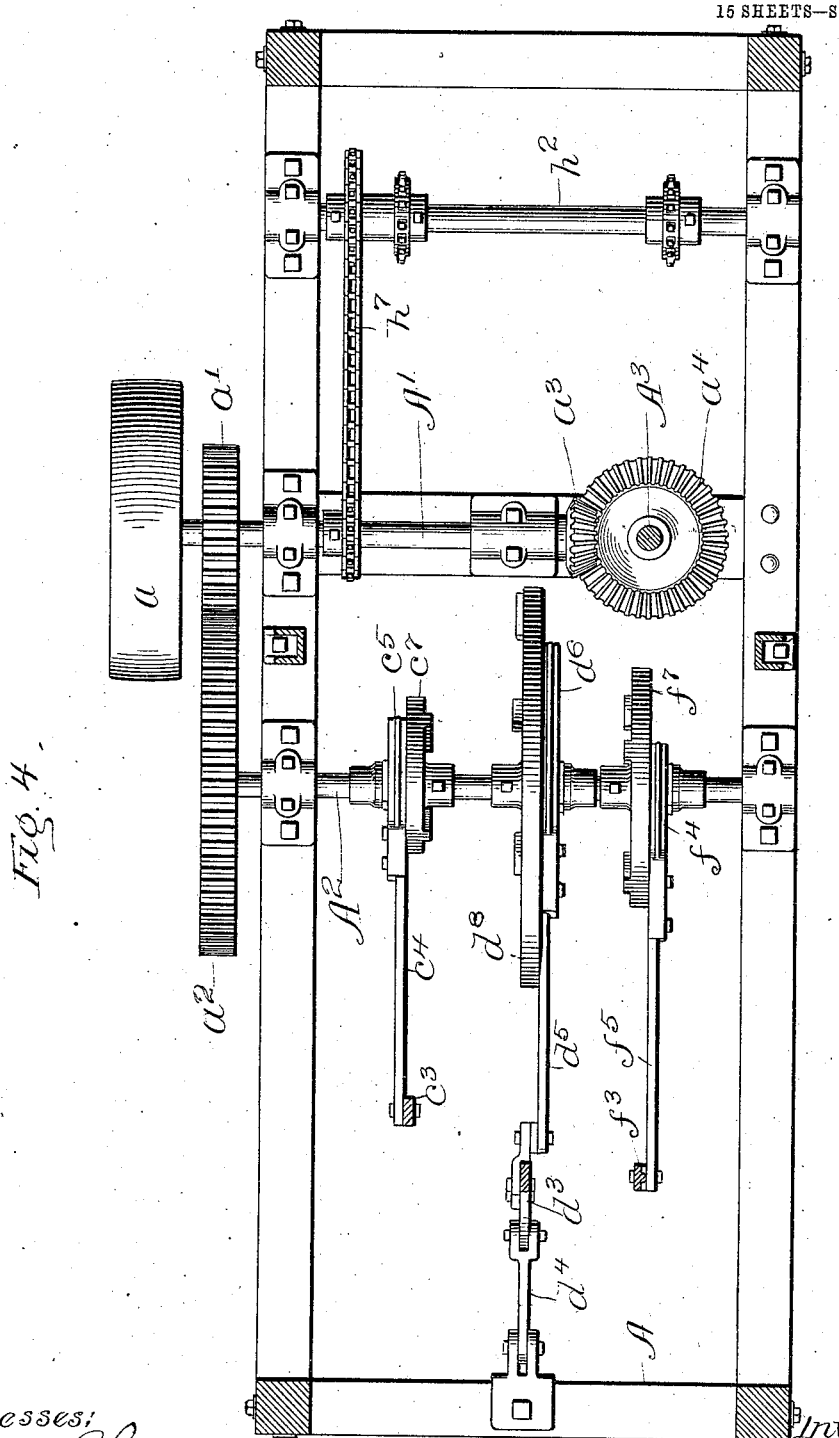

No. 787,696. PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 5.
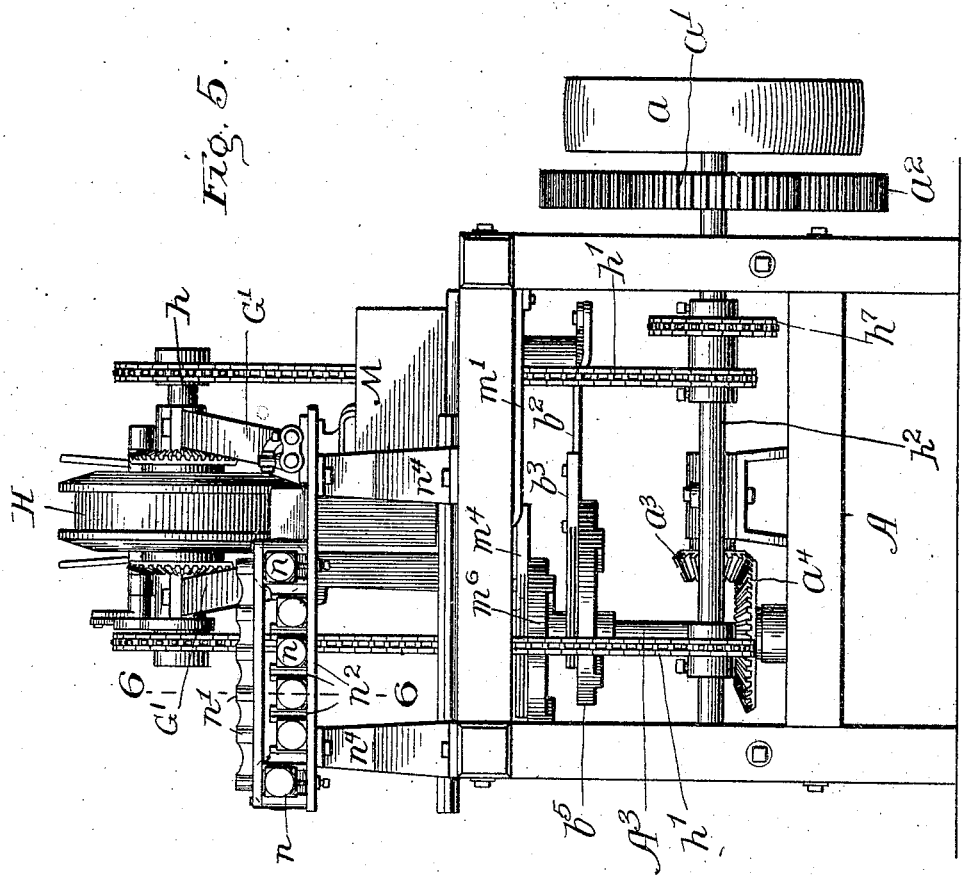
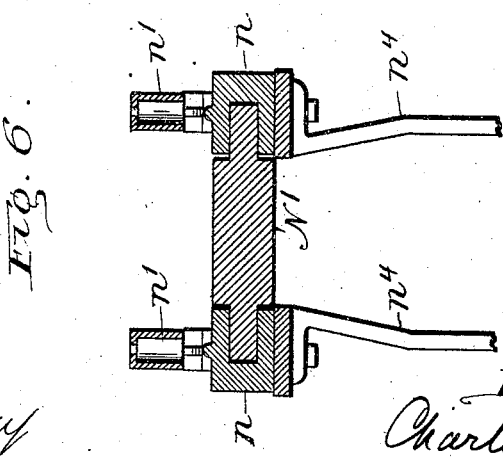
Witnesses:
Chas. O. Shervey
S. Bliss.
Inventor:
Charlie Redd
by H.T. Pitner,
Atty.

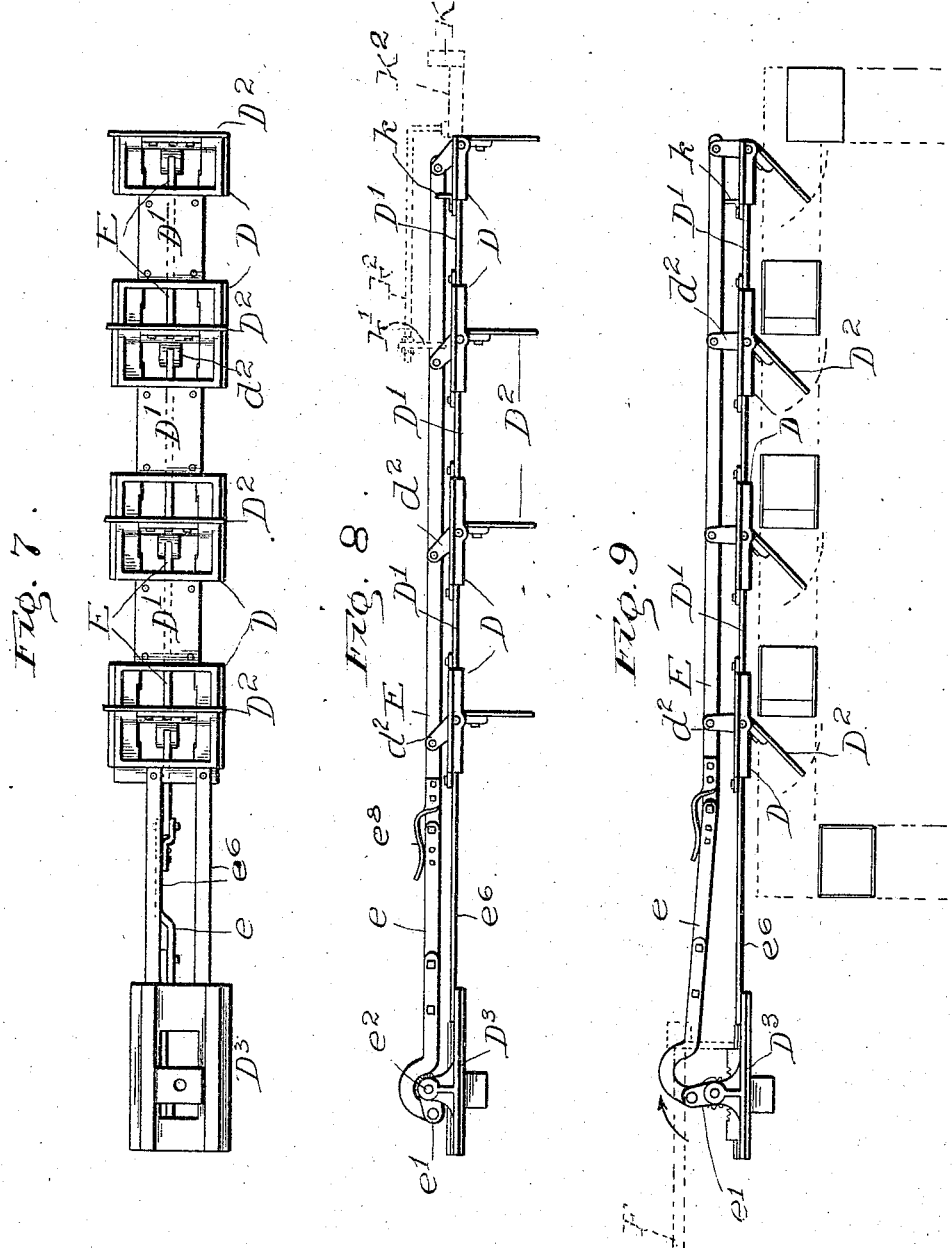

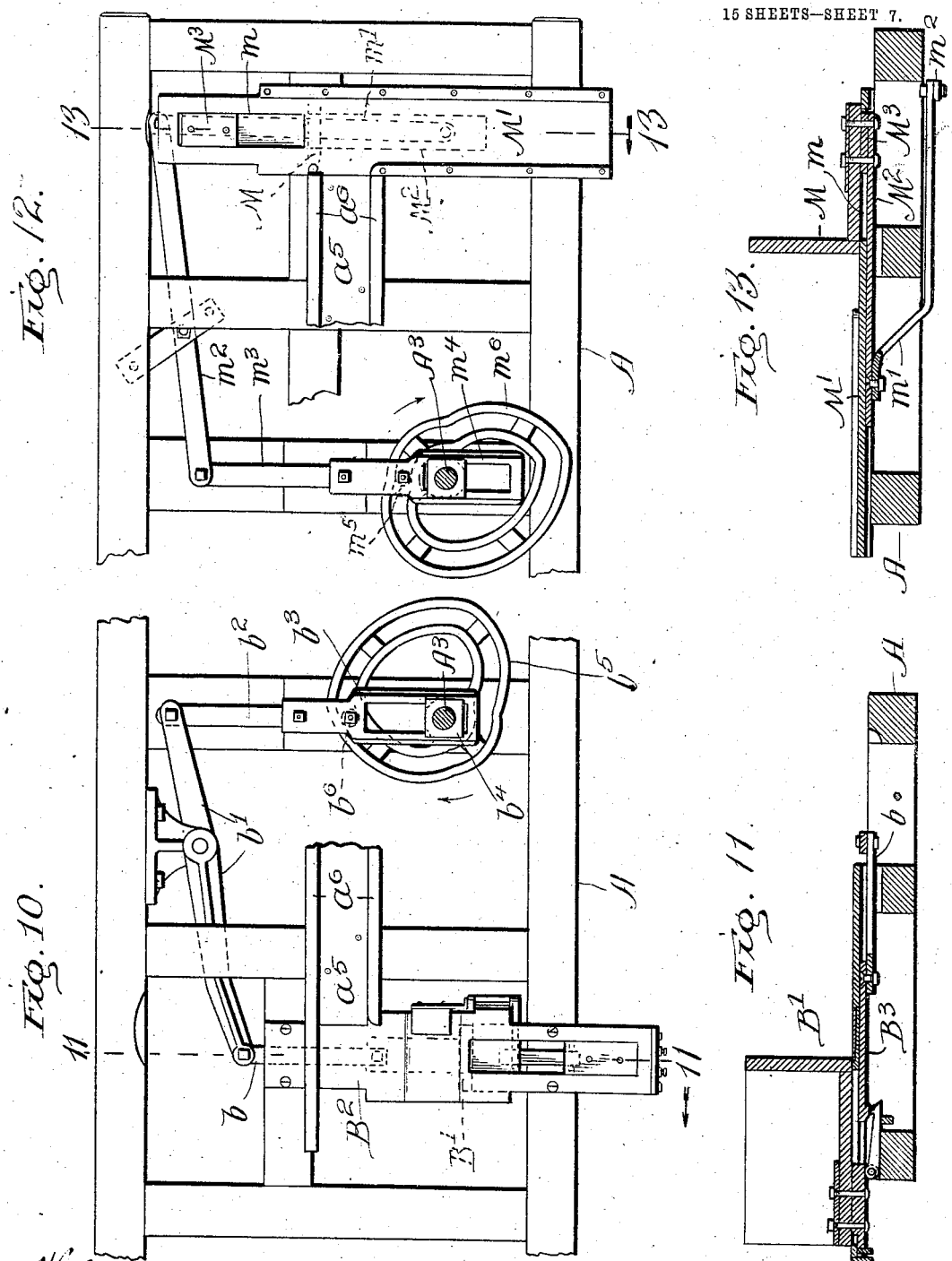

No. 787,696. PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 8.
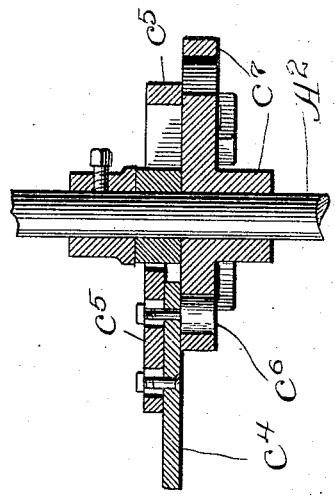
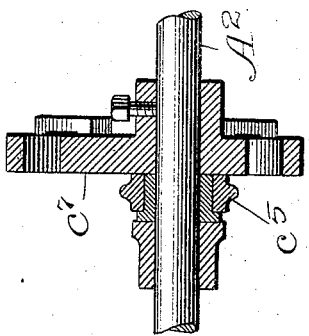
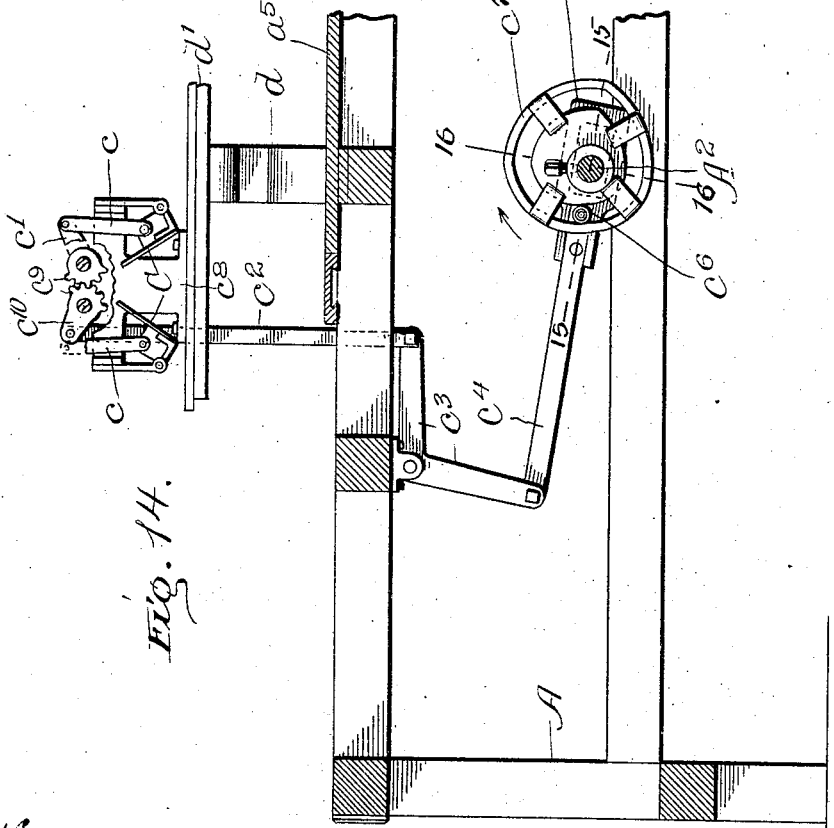
Witnesses:
Chas. O. Shurvey
S. Bliss.
Inventor:
Charlie Redd
by H. Bitner,
Atty.

No. 787,696. PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 9.
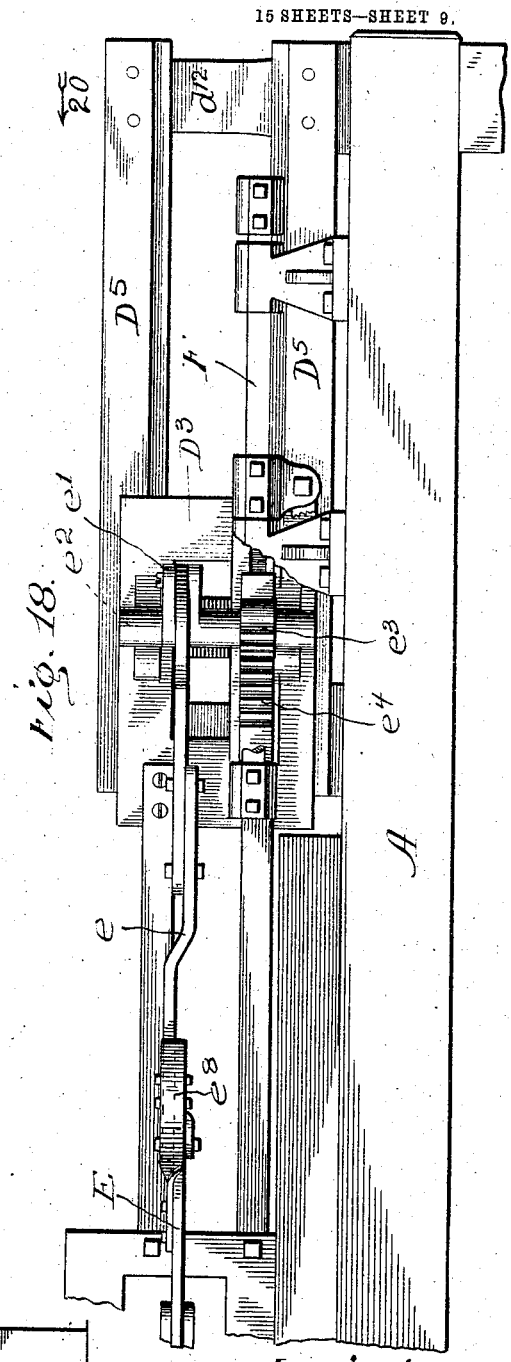
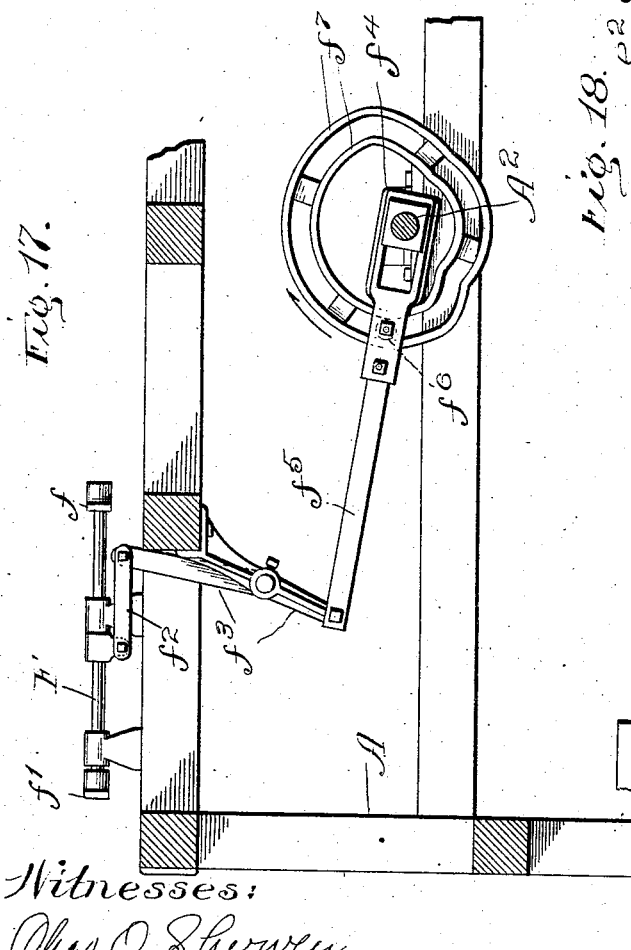
Witnesses:
Chas. O. Shurvey
S. Bliss.
Inventor:
Charlie Redd
by H T Bitner
Atty.

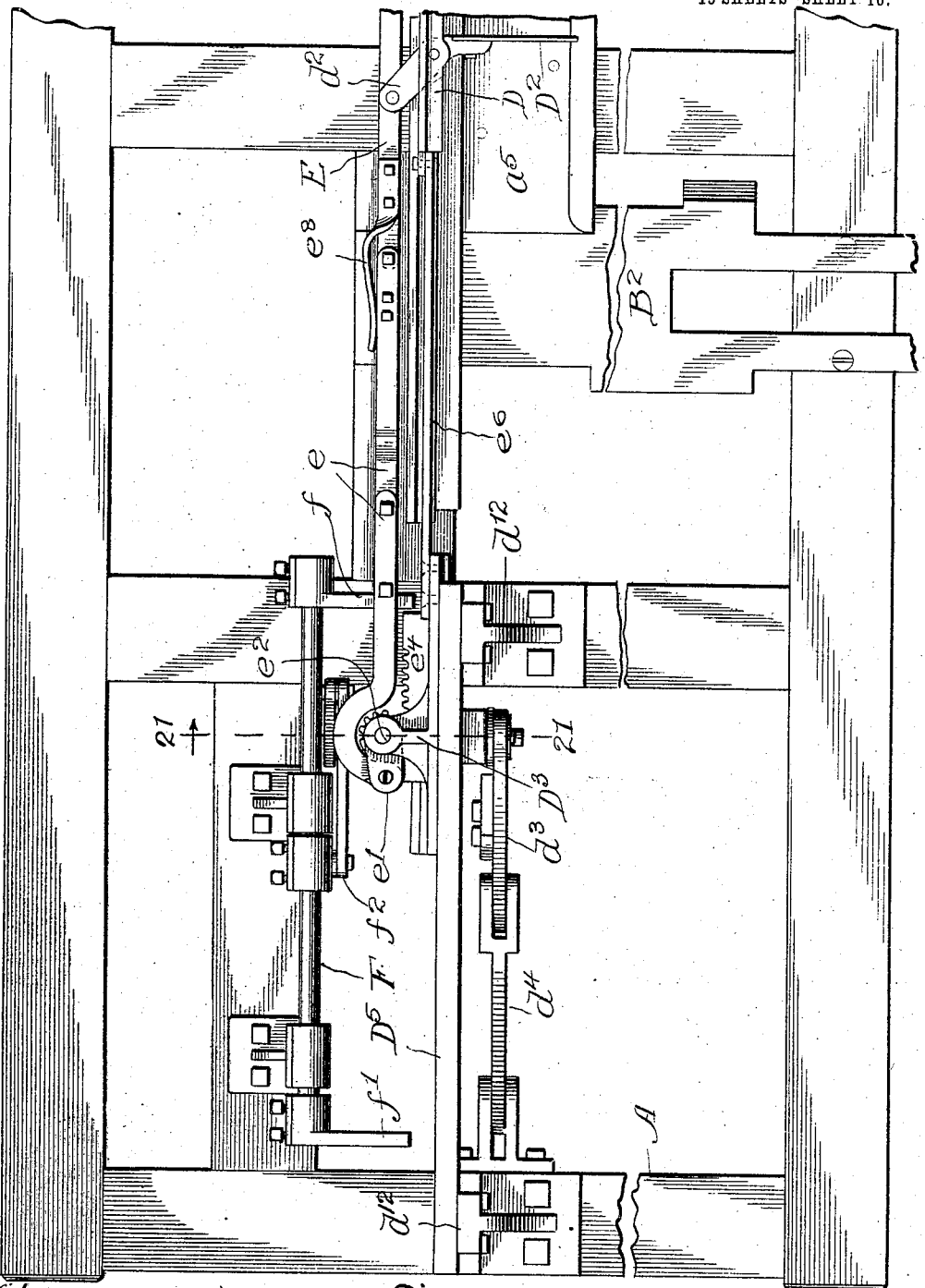

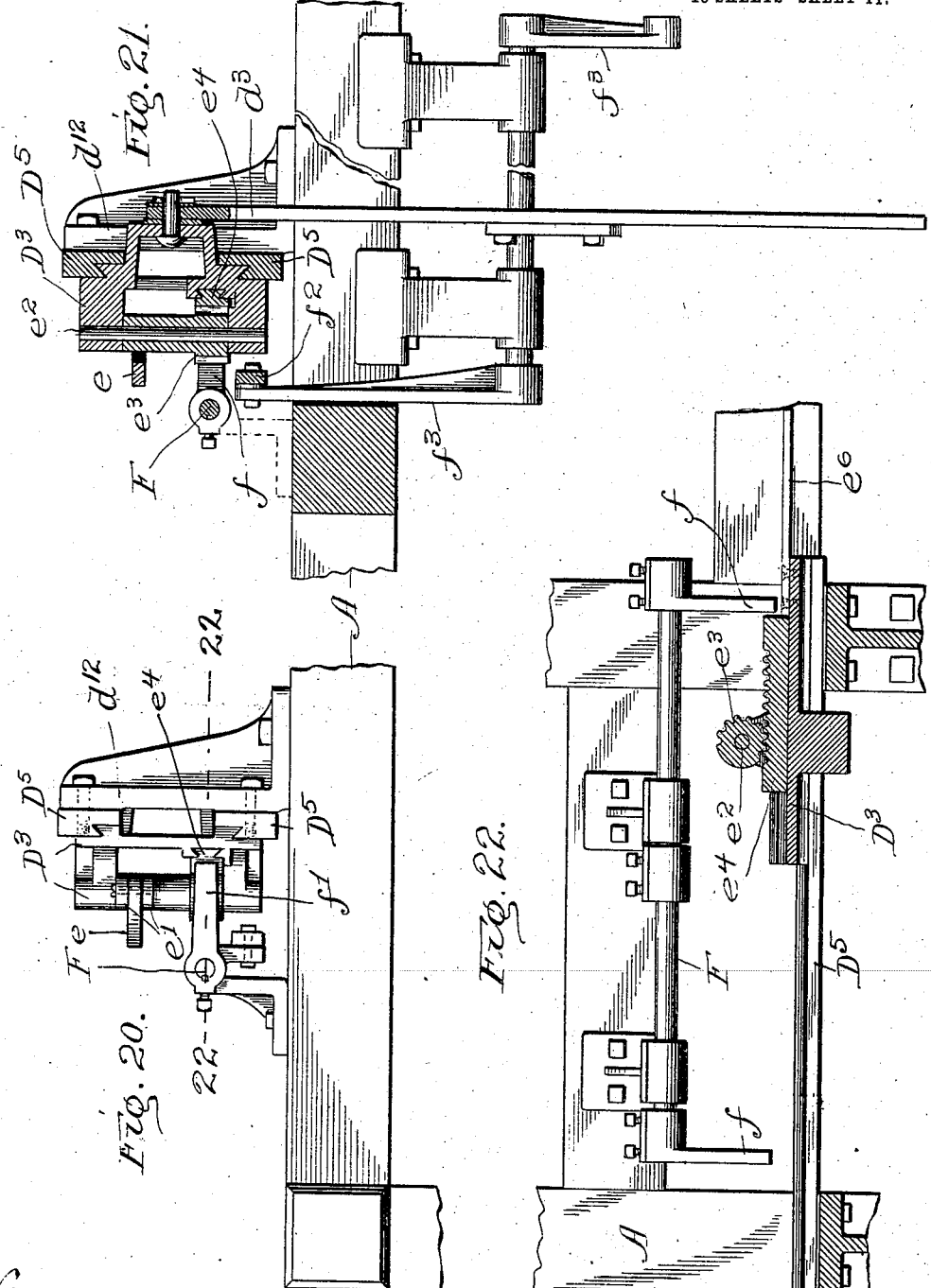

No. 787,696.
PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 12.
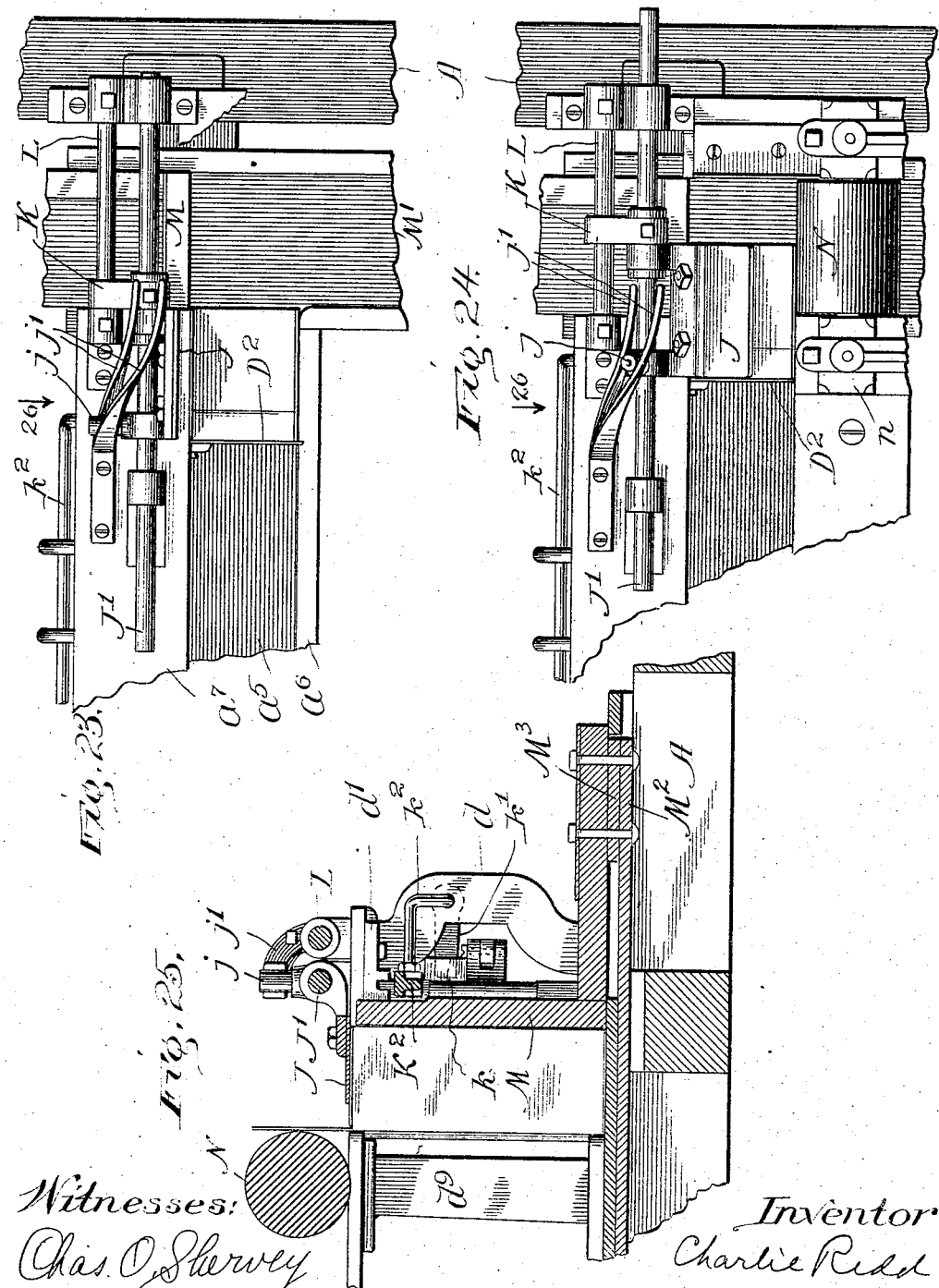
Witnesses:
Chas. O. Shervey
S. Bliss
Inventor:
Charlie Redd
by H. Pitner
Atty.

No. 787,696. PATENTED APR. 18, 1905.
C. REDD.
MACHINE FOR CLOSING AND SEALING THE TOPS OF CARTONS.
APPLICATION FILED JULY 13, 1903.
15 SHEETS—SHEET 13.
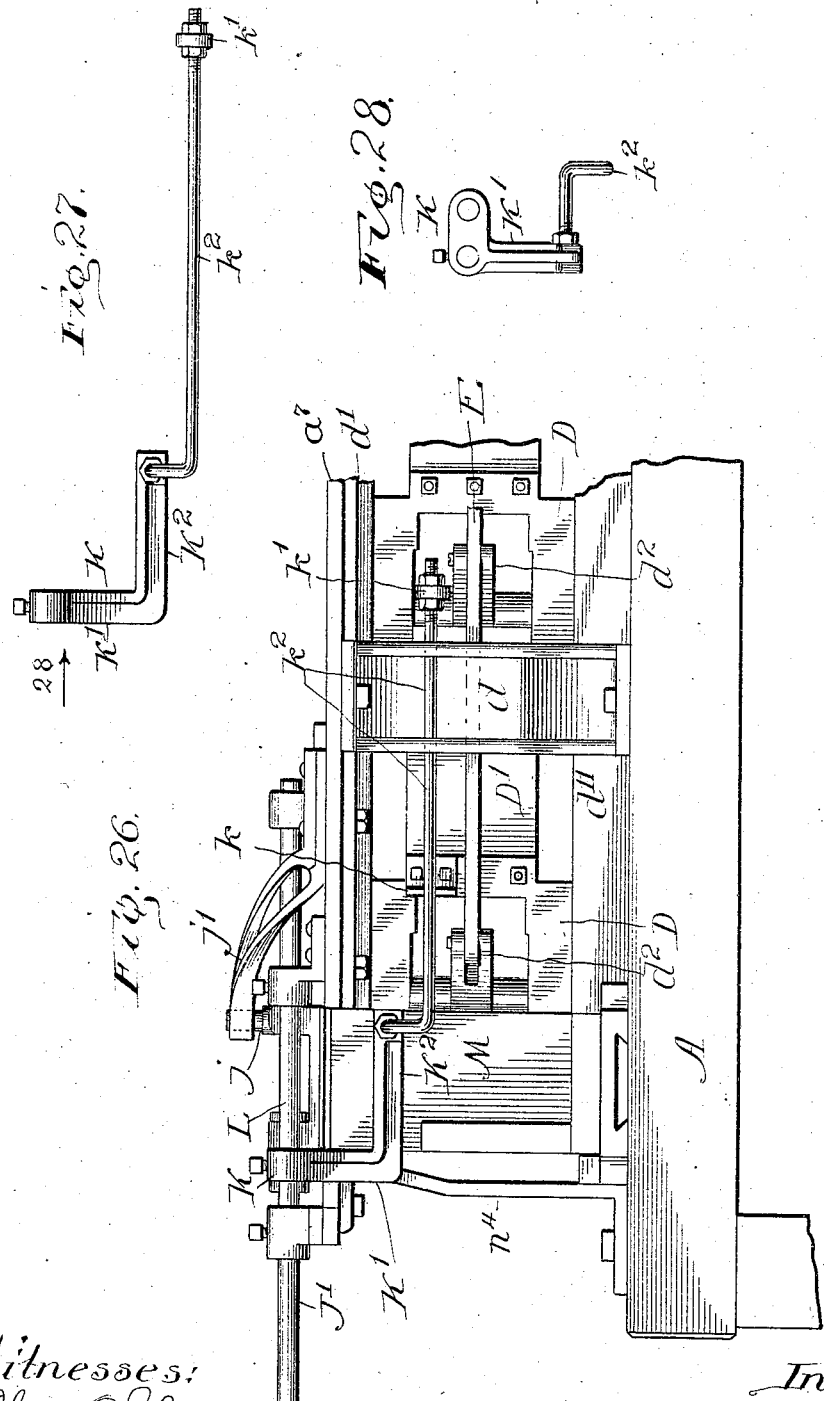

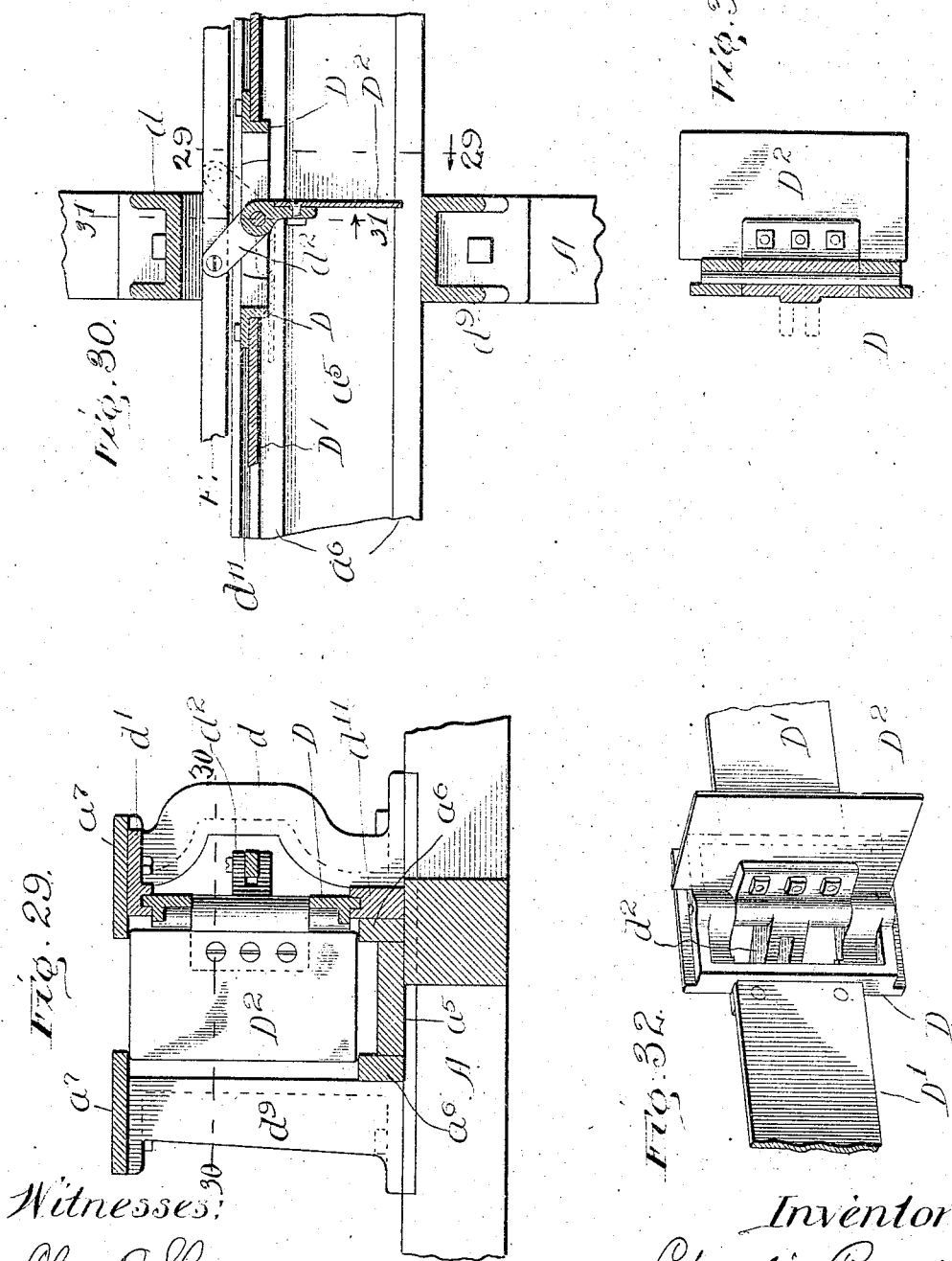

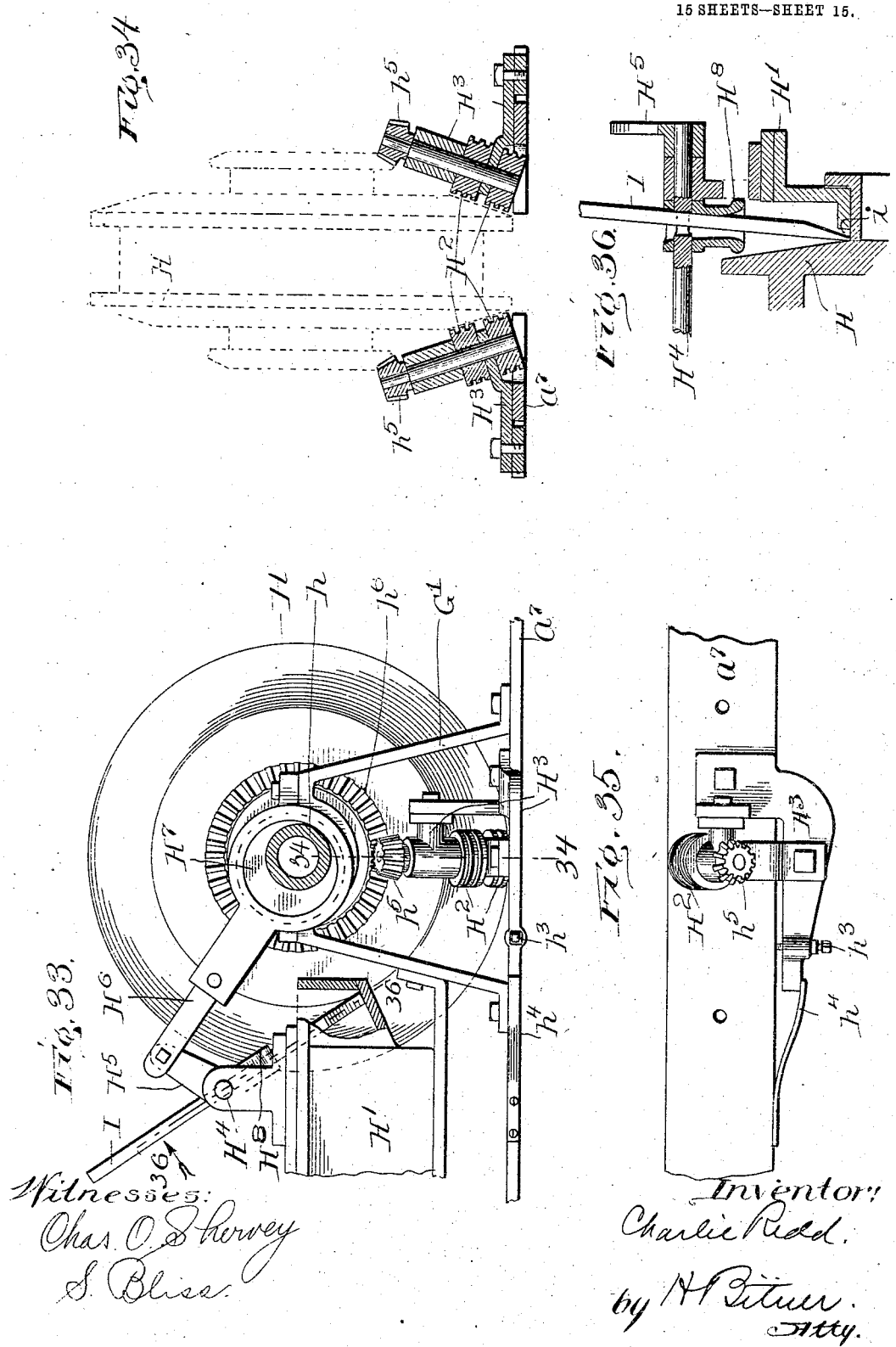

No. 787,696. Patented April 18, 1905.

UNITED STATES PATENT OFFICE.

CHARLIE REDD, OF CHICAGO, ILLINOIS, ASSIGNOR OF ONE-HALF TO ISAAC PIESER AND ONE-HALF TO CHARLES G. LIVINGSTON, OF CHICAGO, ILLINOIS.

MACHINE FOR CLOSING AND SEALING THE TOPS OF CARTONS.

SPECIFICATION forming part of Letters Patent No. 787,696, dated April 18, 1905.

Application filed July 13, 1903. Serial No. 165,267.

*To all whom it may concern:*

Be it known that I, CHARLIE REDD, a citizen of the United States of America, residing at Chicago, in the county of Cook and State of Illinois, have invented certain new and useful Improvements in Machines for Closing and Sealing the Tops of Cartons, of which the following is a specification.

My invention relates to certain new and useful improvements in machines for closing and sealing the tops of cartons. Its object is to produce a machine suitable for this work which shall operate more satisfactorily in certain particulars than have the devices heretofore in use.

The particular points wherein the advantages of this structure lie will appear fully and at large in the course of this specification, wherein the mechanical construction of the machine is fully explained.

To the above ends my invention consists in certain novel features of construction which are fully set forth herein, and illustrated in the drawings furnished herewith.

In the drawings accompanying the specification, Figure 1 is a plan view of the complete machine. Fig. 2 is a side view thereof. Fig. 3 is a vertical longitudinal section taken in the line 3 3 in Fig. 1. Fig. 4 is a view partly in plan and partly in horizontal section, the line of section being indicated at 4 4 in Fig. 2. Fig. 5 is an end view of the machine looking in the direction of the arrow 5 in Fig. 1. Fig. 6 is a detail section through a roller and its bearings used on the machine, the line of section being indicated at 6 6 in Fig. 5. Fig. 7 is a side view of the propeller-frame. Fig. 8 is a plan view thereof. Fig. 9 is also a plan thereof, but showing the vanes in a different position. Fig. 10 is a plan view of the mechanism for feeding the cartons from the main conveyer-belt into the operating-trough, certain of the parts being shown only in dotted lines. Fig. 11 is a vertical section in the line 11 11 in Fig. 10, the parts shown in dotted lines in Fig. 10 being here shown in full lines. Fig. 12 is a plan view of the mechanism for moving the cartons from the main operating-trough into the trough where the last fold is made and from which they are ejected, certain overlying parts being shown in dotted lines only to expose those under them. Fig. 13 is a vertical cross-section in the line 13 13 in Fig. 12, the parts shown in dotted lines in Fig. 12 being here shown in full lines. Fig. 14 is a side view of the mechanism for making the first fold, the transverse members of the frame of the machine being shown in section. Fig. 15 is a detail sectional view of the cam which operates the folders for making the first fold, the line of section being indicated at 15 15 in Fig. 14. Fig. 16 is a detail section in the line 16 16 in Fig. 14. Fig. 17 is a side view of a portion of the mechanism for swinging the paddles upon the propelling-frame, the transverse members of the main frame being shown in section. Fig. 18 is a detail side view of a part of the mechanism which swings said paddles, the view being in the direction indicated by the arrow 18 in Fig. 1, certain of the parts being broken away to show parts which would otherwise be hidden from view. Fig. 19 is a detail plan view of a part of the frame and mechanism for reciprocating the propelling-frame and swinging the paddles thereon. Fig. 20 is an end view of the parts seen in Fig. 18, the view being in the direction indicated by the arrow 20 in said figure. Fig. 21 is a cross-section in the line 21 21 in Fig. 19. Fig. 22 is a view, partly in plan and partly in horizontal section, of the parts seen in Figs. 20 and 21, the line of section being indicated at 22 22 in Fig. 20. Fig. 23 is a detail plan view of the mechanism for folding one of the side flaps down. Fig. 24 is a similar view with certain of the parts in a different position. Fig. 25 is a detail vertical cross-section taken in the line 25 25 in Fig. 1. Fig. 26 is a side view of the parts shown in Figs. 23 to 25, inclusive, looking in the direction of the arrow 26 in Figs. 23 and 24. Fig. 27 is a detail side view of the frame for actuating the flap-folding vanes seen in Figs. 23 to 25, inclusive. Fig. 28 is an end view of the parts seen in Fig. 27, the direction of the view being indicated by the arrow 28 in Fig. 27. Fig. 29 is a detail vertical cross-section of the main operating-trough, showing the propelling-frame therein, the line of section being indicated at 29 29 in Fig. 30. Fig. 30 is a detail horizontal section taken in the line 30 30 in Fig. 29. Fig. 31 is a cross-section through one of the boxes of the conveyer-frame, the line of section being indicated at 31 31 in Fig. 30. Fig. 32 is a perspective view of one of the boxes of the propelling-frame and adjacent parts. Fig. 33 is a side view of a portion of the gluing mechanism. Fig. 34 is a cross-section in the line 34 34 in Fig. 33. Fig. 35 is a plan view of one of the pressure-rollers, and Fig. 36 is a detail vertical cross-section in the line 36 36 in Fig. 33.

Before proceeding to a detailed description of the entire machine I shall first explain the general mode of operation involved and explain in a general way the parts which accomplish these functions.

In the operation of the machine the cartons are placed upon a long belt by which they are brought to the machine. A feeder substantially similar to the one illustrated and described in my patent on machines for closing and sealing up the ends of cartons, No. 733,506, granted July 14, 1903, then shifts the cartons laterally under the folder which folds the front and rear flaps. This folder is substantially similar to the one illustrated and described in the patent to myself and George H. Cormack, No. 733,510, granted July 14, 1903, on flap-folder for carton-machines. The cartons are then pushed forward a certain distance through the operating-trough by a longitudinally-reciprocated paddle. A plurality of these conveying-paddles are attached to a reciprocating frame, and the machine is constructed so that as the frame reciprocates one paddle after another engages with the carton, so that it is pushed through the operating-trough with a step-by-step movement. During its passage through the operating-trough it first encounters a brush which brushes any surplus flour or other material from the flaps, leaving them in proper condition to receive glue. It then passes under a gluing-wheel and receives a coating of glue upon the inside surfaces of the two side flaps. One side flap is then folded down by a folder, and thereupon the entire carton is shifted bodily sidewise under a series of rollers which fold down the second side flap upon the first and hold it in place until the glue is set.

Referring now to the drawings for a more particular description of the mechanism, A indicates the base or main frame of the machine, and it is composed of a plurality of longitudinal and transverse members assembled to form a substantial and reasonably strong foundation for the working parts of the machine. Journaled on the base A is a driving-shaft $A'$, provided with a pulley $a$. The shaft $A'$ is geared to a main cam-shaft $A^2$ through pinions $a'$ $a^2$, the main cam-shaft being arranged in the device shown in the drawings to rotate at half the speed of the driving-shaft $A'$. A vertical cam-shaft $A^3$ is also journaled on the base $A'$ and driven from the main driving-shaft $A'$ by miter-gears $a^3$ $a^4$, these gears also being so proportioned that the vertical cam-shaft will rotate at half the speed of the driving-shaft. It will thus be seen that there are provided two cam-shafts—the "main" cam-shaft, so-called, being horizontal and journaled parallel with the main shaft and the "vertical" cam-shaft extending, as its name indicates, upward from the end of the main driving-shaft. These shafts and the gears connecting them are best seen in Figs. 4 and 5.

Referring now to Fig. 1, which is a plan view of the mechanism, B is the feed conveyer or belt which runs in a suitable trough $b^7$ of proper form to hold the cartons upright, and it is adapted to bring the cartons to the machine. In practice this feed-conveyer generally extends along the length of the room or rooms in which the packages are filled, past the benches of a large number of operatives who are engaged in filling the cartons, and the cartons, as they are filled, are placed upon the belt and brought to the machine. Inasmuch as each operative places cartons upon the belt as fast as he ordinarily works, it is obvious that there can be no regular spacing of the cartons upon this feed-belt and that sometimes there will be a number of cartons close together and at other times there will be considerable spaces between them. It is quite obvious also that it is desirable in any regularly-operating machine to have the packages to be operated upon fed at regular intervals to the operating parts. For this reason the feed mechanism is used. $B'$ is a reciprocating plunger which forces the cartons transversely from the feed-conveyer B through a feed-chute $B^2$ into the main operating-trough and under the front and rear flap folding mechanism. The mechanism which operates this transverse feeder is fully illustrated in Figs. 10 and 11. A very slight description of the mode of operation of this feeder will be required for the reason that the entire mechanism is explained fully and at length in my application, Serial No. 46,319, heretofore referred to. This feed device is practically the same as the one shown and described in my prior application, except for the fact that the continuously-reciprocating member (indicated in the drawings by $B^3$) to which the plunger $B'$ is intermittently connected is connected, by means of a link $b$, a lever $b'$ of the first order pivoted in the base A, and a second link $b^2$, to a slotted head $b^3$. The slotted head is guided, as will be seen in Fig. 10, by a block $b^4$ to move transversely of the machine, and it is reciprocated by a cam-wheel $b^5$ in engagement with a roller $b^6$, dotted lines, Fig. 10, on the head $b^3$. The cam-wheel $b^5$ is mounted, Fig. 2, on the vertical cam-shaft $A^3$ and is rotated thereby. In this manner it will be quite evident from the drawings and from the description of the connection of the parts that the rotation of the shaft $A^3$ and the cam $b^5$ will reciprocate the continuously-reciprocating member $B^3$ of the cross-feed device, and this will by the method of operation set forth in my prior application reciprocate the plunger $B'$ whenever there is a carton in position to be shifted by it.

When a carton is pushed forward by the feeding device, it is first operated upon by the flap-folder, the construction of which is shown and described in the application of myself and George H. Cormack, filed July 1, 1902, Serial No. 113,920.

C C are the moving vanes of the folder, which come into contact with the front and rear flaps of the carton and fold the same down immediately after its entrance into the operating-trough and before it begins to move forward. These vanes are actuated through the medium of links $c$, (see Fig. 14,) arms $c'$, mounted upon shafts journaled in a standard $c^8$, said shafts bearing upon their other ends pinions $c^9$, meshing with each other, one of which is formed with an arm $c^{10}$, connected to a second link $c^2$, a bell-crank lever $c^3$, and a third link $c^4$ by a reciprocating slotted head $c^5$, upon which is a roller $c^6$, engaging with the slot of a cam-wheel $c^7$, mounted upon the main shaft $A^2$. It will be seen from the drawings that this folder is the same in all essential particulars as that shown and described in my prior application referred to, the only difference being in the fact that it is driven from a cam-wheel which rotates in a vertical plane, and consequently certain very simple mechanical changes in the connecting-rods and levers have to be made. These changes are, however, perfectly obvious, and no further explanation of the operation of this folder will be necessary.

The operating-trough extends longitudinally of the machine, and the shape of the trough is best seen in Fig. 29, where $a^5$ represents the bottom thereof, $a^6$ the lower guiding-flanges, and $a^7$ two longitudinally-extending bars supported by posts or standards $d$ $d^9$. The posts $d$ support guide-rails $d'$ $d^{11}$ at the top and bottom. In these guide-rails travel a plurality of longitudinally-movable boxes D, (see Figs. 7, 8, 9, and 29 to 32, inclusive,) which are secured together by a plurality of intermediate webs $D'$. The structure formed of the boxes D and webs $D'$ is termed the "propelling-frame." To each of the boxes D is pivoted upon a vertical pivot a paddle $D^2$, provided with an arm $d^2$, Fig. 30, which extends back from the paddle upon the opposite side of the pivot and forms an angle of approximately one hundred and thirty-five degrees with said paddle. To the ends of the arms $d^2$ is secured a connecting-rod E. This rod is connected to all the arms and runs parallel to the propelling-frame. In the particular machine herein shown and described this frame is shown as having four boxes, and the connecting-rod is consequently pivoted to four arms. It will be obvious that this number may be altered or modified, as desired. The connecting-rod E is connected by a link $e$ (see also Figs. 18, 19) to an arm $e'$ upon a shaft $e^2$, which is vertically journaled in a sliding block or cross-head $D^3$, Figs. 20, 21, 22, at the end of and secured to the propelling-frame by rods or bars $e^6$. The connecting-rod E bears a spring $e^8$, which presses upon the link $e$ and holds the rod and link in a straight line after the link has been moved by the arm $e'$ to its position upon either side of the shaft $e^2$, thereby securing the paddles against accidental movement. The shaft $e^2$ bears a pinion $e^3$, which engages with a reciprocable rack-bar $e^4$, which is guided to move longitudinally in the block $D^3$. The cross-head $D^3$ travels on and is guided between guide-bars $D^5$, supported upon the frame of the machine by standards $d^{12}$. It will be obvious that as the rack-bar $e^4$ is reciprocated in the block $D^3$ the arm $e'$ will swing about its center, thereby reciprocating the connecting-rod E, and consequently swinging the paddles $D^2$ upon their pivots. It will also be seen that the arrangement is such that the rack-bar and the paddles move in the same direction at the same time, so that as the rack-bar is drawn back the paddles also swing back. The general mode of operation of this propelling-frame will be best understood by reference to Figs. 8 and 9, which illustrate diagrammatically the moving parts in two different positions. The frame as a whole reciprocates a little more than one-quarter of the length of the operating-trough. When it is moving forward, the connecting-rod E and the reciprocating rack-bar $e^4$ are in the position shown in Fig. 8, wherein the paddles are at right angles to the line of reciprocation. When the frame reaches its limit of its forward reciprocation, the rack-bar is drawn back and the paddles swing from the position shown in Fig. 8 at right angles to the frame through the position shown in Fig. 9 to the position shown in dotted lines in Fig. 30, where they lie alongside the frame and outside the trough. The frame is then drawn back to its original position, the rack-bar is again pushed forward, swinging the paddles out, and the frame is in position to make a second reciprocation. Each time the frame is moved forward each of the paddles engages with a carton, if one is in place to be operated upon, and moves it forward one-quarter of the distance through the trough. The paddle is then swung back out of the path of the carton and the frame returned. Each paddle is then swung out behind the carton next behind the one which it last operated upon. In this way the cartons are forced through the machine with a step-by-step movement, the first paddle taking the carton from the folding-machine and the last one delivering it to the ejecting mechanism.

I shall now describe the mechanism by which the propelling-frame and the reciprocating rack-bar are operated. It will be seen from the foregoing description of the movements performed by these parts that the mechanism will consist of two parts, one reciprocating the propelling-frame and the other reciprocating the rack-bar $e^4$ with reference thereto.

The cross-head $D^3$ is connected to a lever $d^3$, Figs. 3 and 4, which lever is pivoted at its lower end to a supporting-link $d^4$, swung upon the frame. The lever $d^3$ is pivotally connected near its center to a connecting-rod $d^5$, to which is secured a slotted head $d^6$, which bears a roller $d^7$, (dotted lines in Fig. 3,) running in a slot of a cam-wheel $d^8$, mounted upon the main cam-shaft $A^2$. It will be seen that as this wheel is rotated the lever $d^3$ will be swung back and forth and reciprocate the propelling-frame to which it is connected. Beside the rear end of the propelling-frame is mounted a longitudinally-reciprocable rod F, Figs. 19 and 22, which bears at its end two projecting arms $f f'$, which project into the path of the rack-bar $e^4$. These arms strike and reciprocate the rack-bar, with reference to the block $D^3$, when the rod F is reciprocated. When the parts are in the position shown in Fig. 19, the propelling-frame is in its most advanced position and is ready for the rack-bar to be drawn back and the paddles to be turned. When this position is reached, the rod F is drawn backward by mechanism which I shall presently describe and the arm $f$ strikes the rack-bar, moving it backward and swinging the paddles in the proper manner. The frame itself then moves backward to its rearmost position. When this position is reached, the rod F is drawn forward and the arm $f'$ strikes the opposite end of the rack-bar, pulling it forward and swinging the paddles into the path of the cartons. The reciprocations of the bar F take place immediately after the propelling-frame reaches the end of its stroke and before it commences movement in the opposite direction.

The mechanism for reciprocating the bar F is shown in Fig. 17 and consists of a link $f^2$, secured at one end to the rod F, a lever consisting of two arms $f^3$, and a connecting-shaft, one of said arms being pivoted to the link $f^2$, and the shaft being journaled upon the frame, a slotted head $f^4$, a connecting-rod $f^5$ between the head $f^4$ and the end of the lever, a roller $f^6$, mounted upon the head $f^4$, and a cam-wheel $f^7$, engaging with said roller to reciprocate said head. This cam-wheel $f^7$ is mounted upon the main cam-shaft $A^2$ and is substantially of the form shown in Fig. 17.

In the top of the operating-trough and between the folder for the front and rear flaps and the next set of mechanism which operates upon the carton is secured a brush G, of substantially the width of the carton. As the carton passes through the trough this brush enters the space between the two side flaps and passes over the front and rear flaps, which have been folded into position by the vanes C, and removes any flour which may be on the adjacent sides of these flaps and leaves them clean, free from dust, and in proper condition to receive the glue. The sides of the brush also strike the inner surfaces of the side flaps and remove any dust from them. It is obvious that this feature will be of very great advantage in carton-closing machines, for the reason that one of the greatest difficulties which has been experienced is that there is frequently so much flour upon the flaps that it is impossible to bring the flaps into contact and to cause them to adhere to each other.

After passing by the brush G the carton next comes in contact with the gluing-wheel, which is indicated in the drawings by H and best shown in Figs. 33 and 34. The gluing-wheel H is mounted upon a shaft $h$, which is journaled in standards G' and is driven by sprocket-chains $h'$, running over sprockets upon a shaft $h^2$, journaled on the frame A and driven from the main driving-shaft $A^2$ by a sprocket-chain $h^7$. The gluing-wheel is substantially the same as that shown and described in my prior application above referred to and runs in a glue-pot H', supported upon the bars $a^7$. Pressure-rollers $H^2$ are mounted upon suitable shafts journaled in brackets $H^3$ and are adapted to hold the side flaps of the carton in close contact with the gluing-wheel. The brackets $H^3$ are pivoted, as shown in Fig. 35, to the bars $a^7$ and are provided with adjusting-screws $h^3$ and with springs $h^4$, by which a spring-pressure is maintained. These pressure-rolls $H^2$ are provided with miter-gears $h^5$, in mesh with similar gears $h^6$, connected to the gluing-wheel. In this way the gluing-wheel and the pressure-rolls are made to run with substantially the same peripheral velocity. The main point of difference between these gluing devices and the one above referred to, as shown and described in my prior application, lies in the fact that a stirrer is provided which runs back and forth over the gluing-surface of the wheel, scraping off the old glue and keeping the surface constantly fresh. This stirrer is best shown in Figs. 33 and 36. A rock-shaft $H^4$ is journaled above the glue-pot, and this shaft is provided with an arm $H^5$, which is pivoted to a connecting-rod $H^6$. This connecting-rod has an enlarged open end, within which lies an eccentric $H^7$, mounted upon the shaft $h$ of the gluing-wheel. As this shaft is rotated, therefore, the shaft $H^4$ is rocked.

The shaft is also provided with radial tubes H⁸ and is perforated in line with the same. Through these tubes are passed stirrers I, preferably made of metal with a wedge-shaped end. These stirrers rest on that portion of the glue-pot adjacent to the surface of the gluing-wheel and are guided in grooves $i$, Fig. 36, therein. As the shaft H⁴ is rocked these stirrers pass back and forth in the grooves across the working face of the gluing-wheel, scraping off the glue and keeping the working surface of the gluing-wheel clean and in good condition. The addition of a stirrer to the ordinary gluing apparatus is very advantageous, because it insures the application of fresh glue to each carton. This particular form is especially desirable, because the stirrer rests against the gluing-wheel with an elastic pressure, due to its own weight, and having such an elastic pressure simulates very exactly the natural motion of stirring glue. Furthermore, the stirrer can be readily removed for cleaning purposes or when it is desired to stop the machine and remove the heat from the glue-pot. Consequently there is no necessity of its ever becoming caked in hard glue. It can also be replaced with very great ease when worn out or lost.

After the cartons have passed the gluing-wheel they are operated upon by a folder which folds down one of the side flaps upon the front and rear flaps. It is obvious that in building a machine it makes little difference upon which side this folder is placed. In the machine herein illustrated the flap on the opposite side from the feeder is first folded down—that is to say, the flap on the same side of the operating-trough as the propelling-frame. It is more convenient to have the folder situated upon the same side of the machine with the propelling-frame, but by no means necessary that it be so placed. The vane by which the side flap is folded down is indicated by J, Figs. 23 to 25, and the entire mechanism for folding this side flap is best illustrated in Figs. 23 to 28. The vane J is secured to a rotatable and reciprocable shaft J' and is provided with a radial arm $j$, which runs in a stationary spiral guide $j''$. This spiral guide has the same length as the distance which the shaft J' reciprocates, and in that distance it makes approximately a one-fourth turn. It will be seen that as the shaft is reciprocated longitudinally the projecting arm $j$ by its engagement with the spiral guide will be swung through an arc of approximately ninety degrees, and thereby rotate the shaft, the vane of course swinging through a corresponding arc. The parts are so arranged that when the shaft is back—that is, toward the folder end of the machine—the vane is practically vertical, and as the shaft is pushed forward the vane swings down over the operating-trough into a substantially horizontal position, as shown in Fig. 25. Such a movement will of course push down the adjacent side flap of a carton upon the front and rear flaps. I shall now describe the mechanism by which the reciprocation of the shaft J' is effected. A slide K is secured to the shaft J between two collars, so as to be rotatable thereon, but not longitudinally movable with respect thereto. This slide is guided by a stationary guide-shaft L and has a vertical arm K', Fig. 26, which extends downward below the shaft L, and from the end of this arm there extends an arm K² toward the rear of the machine. This arm is in the path of the forward box D of the propelling-frame, (see dotted lines, Fig. 8,) so that as said propelling-frame comes forward it strikes the arm K² and moves it forward, thereby advancing the shaft J' at the same speed with the propelling-frame and cartons carried thereby. The vane J is therefore swung down and moved forward, the forward motion being at the same speed as that of the carton upon which it is operated. The shaft J' and vane J are returned to their original position by the engagement of an ear $k$ upon the propelling-frame with a projecting finger $k'$ (see Figs. 8 and 26) upon or near the end of a wire or light rod $k^2$, which is secured to and extends backward from the end of the arm K². It will be seen that after the vane J is moved forward and lowered the propelling-frame completes a large part of its return movement before the ear $k$ reaches the finger $k'$, and consequently the vane remains stationary for some time after the frame begins to move backward. This form of folder has certain advantages over other types of folders, which will now be set forth. In the first place, a folder which swings upon a pivot so as to lower the flaps with a rotating folding motion is much more desirable than one wherein the flap is struck a comparatively violent blow and forced into place. This plunger type of folder is much more likely to make the fold in the wrong part of the flap than is the folder which turns the flap into place. Furthermore, my device can be used without danger of improper folding with a lighter grade of cardboard. A further advantage, however, and one which is of much more importance lies in the fact that the flap-folding vane moves with the carton and at exactly the same speed as the carton, so that there is no friction which would tend to disarrange the flaps and to cause them to take improper positions. One of the greatest difficulties which has been experienced heretofore in carton-machines arises from the fact that when the side flaps are folded the carton has been moving longitudinally with respect to the folding mechanism, so that the tendency is to twist the flaps backward from the score-marks. This difficulty is entirely avoided in my improved machine by causing the vane to move at the same speed with the carton, so that there is absolutely no relative movement between the flap and the vane until the vane is in place and has been held firmly in place for an appreciable period of time. While other means can doubtless be devised for moving the vane at the same speed as the carton, still it appears that the simplest and most desirable is that wherein the carton-propelling device or parts attached thereto comes in contact with and moves the folding-vane. In this way there is absolutely no possibility of relative longitudinal movement between the parts.

As was explained in the preliminary description of the operation, the folding of the last flap which completes the closing operation is accomplished by shifting the carton bodily sidewise under a series of rollers to hold down the second side flap thereof. This shifting operation takes place when the carton reaches the eduction-trough and approximately at the time that the return movement of the propelling-frame commences, but before the ear $k$ comes in contact with the projecting finger $k'$ upon the wire or rod $k^2$. In other words, the carton is shifted sidewise after the last paddle has moved it forward, but while the first side flap is still being held in place and in firm contact with the front and rear flaps by the folding-vane J. The mechanism by which this shifting is accomplished is illustrated in Figs. 12 and 13, it being remembered that in Fig. 12 certain overlying parts are shown in dotted lines. M is an ejecting-plunger which reciprocates in an eduction-trough M' and crosses the end of the operating-trough, the termination of which is shown in Fig. 12. The ejecting-plunger M, it is to be noted, contains two portions at right angles to each other, one vertical and one horizontal. The horizontal portion is bolted or otherwise secured to a reciprocating slide $M^2$, which is guided under the bottom of the eduction-trough M' and is capable of longitudinal reciprocation. The space between the reciprocating plunger M and the slide $M^2$ is occupied by a block $M^3$, which lies in a slot $m$ in the bottom of the eduction-trough M'. The reciprocating slide $M^2$ is connected by a link $m'$ to a lever $m^2$, pivoted between its ends to a bracket upon the frame. The opposite end of the lever $m^2$ is connected by a link $m^3$ to a slotted head $m^4$, upon which is a roller $m^5$, (dotted lines, Fig. 12,) which engages with a slot in a cam-wheel $m^6$. The cam-wheel $m^6$ is horizontal and is the upper wheel upon the vertical cam-shaft $A^3$. (See Fig. 2.) The cam is so timed that the plunger M will move forward with every reciprocation of the propelling-frame and will strike the carton when the parts are in the position above set forth for the shifting thereof. A series of rollers N N' $N^2$ are provided in the top of the eduction-trough, and they are separated from the bottom thereof about the height of a carton. The method of journaling the rollers is illustrated in Fig. 6, which is a section through one of the rollers and its bearings. Vertically-sliding journal-boxes $n$ are provided, in which the rollers are journaled, the boxes being guided in a frame $n^2$, supported upon posts $n^4$. Hollow vertical cups $n'$ are provided in the frame $n^2$ above the sliding journal-boxes $n$, in which springs may be inserted if it is found that the weight of the rollers alone does not cause sufficient pressure upon the cartons. In practice, however, it is found that the mere weight of the rollers, which are preferably of iron, is sufficient to exert all necessary pressure. The first and last rollers N and $N^2$, respectively, are made of considerably larger diameter than the other rollers in order to produce an increased pressure at those times. In view of this explanation of the construction of the eduction-trough the manner in which the second side flap is folded down will be readily understood. The carton is pushed from under the folding-vane J under the first roller N—that is, it is shifted to the left from the position shown in Fig. 25—so that the flap which is shown in contact with the roller is folded down. The carton remains in position under the roller N until the next carton is shifted sidewise. The second carton moves the first one along toward the end of the eduction-trough, and it does not leave the trough and the pressure of the rollers until enough cartons have passed through the machine to fill the eduction-trough entirely and force the first one out at the end. In this way the cartons are kept under a continual pressure for a considerable time, so that the glue has ample time to set. This method of folding the last flap is especially desirable, for the same reasons pointed out for the method of folding the first side flap—that is, there is no longitudinal movement between the surfaces and the folding flap, all the movement there is being across the flap at right angles thereto and not parallel with the flap. Inasmuch, however, as the rollers turn freely in their bearings there is little or no relative movement between the surfaces. This device for folding the last flap also coöperates admirably with the device for folding the first side flap, inasmuch as the vane J holds the first flap in position until the carton is pushed completely out of the operating-trough into the eduction-trough. From the moment, therefore, that the folding of the two side flaps is commenced they are under continuous pressure and move along under folding and pressing surfaces which have no movement parallel to the folds and very little movement with respect to the flaps in any direction.

I realize that considerable variations are possible in the details of this construction without departing from the spirit of the invention, and I therefore do not intend to limit myself to the specific form herein shown and described except as pointed out in the claims.

I claim as new and desire to secure by Letters Patent—

1. In a device of the class described, the combination with mechanism for folding the front and rear flaps of a carton, mechanism for advancing the carton along a predetermined path, and mechanism for folding the side flaps, of a gluing-wheel interposed between the two folding mechanisms, a glue-pot through which the wheel runs, a rock-shaft mounted adjacent to the gluing-wheel, stirrers actuated by said rock-shaft and having their free ends adjacent to the surfaces of the gluing-wheel within the glue-pot, and mechanism actuated by the gluing-wheel for rocking the rock-shaft to move said stirrers.

2. In a device of the class described, the combination with mechanism for folding the front and rear flaps of a carton, mechanism for advancing the carton along a predetermined path, and mechanism for folding the side flaps, of a gluing-wheel interposed between the two folding mechanisms, a glue-pot through which the wheel runs, a rock-shaft mounted adjacent to the gluing-wheel, stirrers actuated by said rock-shaft and having their free ends adjacent to the surfaces of the gluing-wheel within the glue-pot, an eccentric upon the shaft of the gluing-wheel and connections between said eccentric and said rock-shaft whereby said rock-shaft is rocked as said wheel is rotated.

3. In a device of the class described, the combination with mechanism for folding the front and rear flaps of a carton, mechanism for advancing the carton along a predetermined path, and mechanism for folding the side flaps, of a rock-shaft mounted adjacent to said gluing-wheel and above said glue-pot, stirrers passing through a perforation in said shaft and loosely fitting the same, and means for rocking said rock-shaft.

4. In a device of the class described, the combination with means for gluing and folding the flaps of a carton, of propelling devices for said cartons, adapted to move the same through the machine, and containing an engagement member adapted to move alternately in the path of the carton and out of the path of the carton.

5. In a device of the class described, the combination with means for gluing and folding the flaps of a carton, of propelling devices for said cartons, adapted to move the same through the machine, and containing a plurality of paddles hinged thereto, means for moving said paddles into a position at right angles to the line of reciprocation of said frame during its forward movement, and means for swinging said paddles into the line of reciprocation and out of the path of the cartons during the retrograde movement thereof.

6. In a device of the class described, the combination with mechanism for gluing and folding the flaps of cartons, of a reciprocating propelling-frame, means for reciprocating the same, a plurality of paddles and means for swinging said paddles into a position at right angles to said frame before it commences its forward motion and for swinging said paddles into line with the frame and out of the path of the cartons before the frame commences its return movement.

7. In a device of the class described, the combination with mechanism for gluing and folding the flaps of cartons, of a reciprocating propelling-frame, paddles hinged thereto, a connecting-rod secured to the paddles, means for reciprocating the frame, and means for moving the connecting-rod with reference to the frame to swing the paddles into a position at right angles to the frame at the beginning of the forward movement of the frame and into a position against the same at the beginning of the return movement thereof.

8. In a device of the class described, the combination with mechanism for gluing and folding the flaps of cartons, of a reciprocating propelling-frame, paddles hinged thereto, arms upon the paddles, a connecting-rod secured to the arms, a reciprocable rack-bar mounted to move longitudinally of the frame, a pinion in engagement with said rack-bar, an arm-and-link connection between said connecting-rod and said pinion, means for reciprocating the frame, and means for moving the rack-bar with reference to the frame to swing the paddles at right angles to the frame at the beginning of the forward movement thereof and against the same at the beginning of the return movement thereof.

9. In a device of the class described, the combination with mechanism for gluing and folding the flaps of cartons, of a reciprocating propelling-frame, paddles hinged thereto, arms upon the paddles, a connecting-rod secured to the arms, a reciprocable rack-bar mounted to move longitudinally of the frame, a pinion in engagement with said rack-bar, an arm-and-link connection between said pinion and said connecting-rod, means for reciprocating the frame, a reciprocating shaft mounted adjacent and parallel to the propelling-frame, means for reciprocating the shaft, and projecting ears secured to said shaft and adapted to come into contact with the rack-bar to shift the same longitudinally of the frame, and swing the paddles into a position at right angles to the frame at the beginning of the forward movement thereof and against the same at the beginning of the return movement.

10. In a device of the class described, the combination with a suitable frame, means for conveying cartons in succession through the machine, folding devices for the front and rear flaps of the cartons, and means for applying glue to the inner surfaces of the side flaps, of a single folder arranged to operate successively on one of the side flaps of each carton, means for moving the folder forward with, and at the same speed as the carton while operating thereon and for swinging the same down upon the top of the carton to fold the side flap, and suitable means for folding down the last side flap.

11. In a device of the class described, the combination with means for folding the front and rear ends of the cartons, means for applying glue to the inner surface of the side flaps, and means for conveying cartons in succession through the machine, of a second folder, operating upon each carton successively to fold the first side flap, said folder being constructed to engage with the carton-advancing mechanism to be moved forward with, and at the same speed as, each successive carton, means for pressing the folder down upon each successive carton as it is moved forward and means for subsequently folding the second side flap.

12. In a device of the class described, the combination with means for folding the front and rear flaps of cartons and applying glue to the inner surfaces of the side flaps, and means for propelling the cartons through the machine, of a rotatable and longitudinally-reciprocable shaft mounted adjacent and parallel to the path of the cartons, a folding-vane secured to said shaft, means for reciprocating said shaft with a forward movement simultaneously with the passage of a carton and at the same speed with the same, means for rotating said shaft while in longitudinal motion to bring said vane down upon the carton to hold one of the side flaps, and means for subsequently folding the other side flap.

13. In a device of the class described, the combination with means for folding the front and rear flaps of cartons and applying glue to the inner surfaces of the side flaps, and means for propelling the cartons through the machine, of a rotatable and longitudinally-reciprocable shaft mounted adjacent and parallel to the path of the cartons, a folding-vane secured to said shaft, means for reciprocating said shaft with a forward movement simultaneously with and of equal speed with the passage of a carton, a projecting arm upon said shaft, a spiral guide engaging with said arm and adapted to rotate said arm as it is reciprocated to bring said vane down upon a carton to fold one of the side flaps and means for subsequently folding the other side flap.

14. In a device of the class described, the combination with mechanism for folding the front and rear flaps of a carton, means for applying glue to the side flaps, and a reciprocating propelling-frame adapted to propel the carriers through the machine, of a rotatable and longitudinally-reciprocable shaft mounted adjacent to the path of the cartons and parallel to the same, a flap-folding vane secured to said shaft, an arm also secured to said shaft, a stationary spiral guide adapted to engage with said arm to rotate said shaft when it is reciprocated and bring said flap-folding vane down upon the carton to fold one of the side flaps thereof, a projecting member secured to said shaft and in the path of the reciprocating frame, whereby the shaft is moved forward at the same speed with the carton, means for withdrawing said shaft to its original position, and means for subsequently folding the second flap of the carton.

15. In a device of the class described, the combination with mechanism for folding the front and rear flaps of a carton, means for applying glue to the side flaps, and a reciprocating propeller-frame adapted to propel the cartons through the machine, of a rotatable and longitudinally-reciprocable shaft mounted adjacent to the path of the cartons and parallel to the same, a flap-folding vane secured to said shaft, an arm also secured to said shaft and a stationary spiral guide adapted to engage with said arm to rotate said shaft when it is reciprocated and bring said flap-folding vane down upon the carton to fold one of the side flaps thereof, a projecting member secured to said shaft and in the path of the reciprocating frame, whereby the shaft is moved forward at the same speed with the carton, a second projecting member secured to said shaft adapted to engage with an ear upon said frame to withdraw said shaft to its original position after the former has been retracted more than the length of the carton, and means for subsequently folding the second side flap.

16. In a device of the class described, the combination with mechanism for folding the front and rear flaps of a carton, means for applying glue to the side flaps, and means for advancing the carton through the machine and leaving the same at rest opposite the eduction-trough, of a folding-vane moving at the same speed with the carton, means for actuating the vane to fold one of the flaps of the carton, and means for shifting the carton bodily into the eduction-trough while the vane is in contact therewith, the second flap coming into contact with the top of the eduction-trough and being folded thereby.

17. In a device of the class described, the combination with mechanism for folding the front and rear flaps of a carton, means for applying glue to the side flaps, and means for advancing the carton through the machine and leaving the same at rest opposite the eduction-trough, of a folding-vane moving at the same speed with the carton, means for actuating the vane to fold one of the flaps of the carton, and a reciprocating plunger oscillating in the path of the carton and adapted to shift the same bodily sidewise into the eduction-trough while the vane is in contact therewith, the second flap coming into contact with the top of the eduction-trough and being folded thereby.

18. In a device of the class described, the combination with mechanism for folding the front and rear flaps of a carton, mechanism for applying glue to the side flaps, a reciprocating propeller adapted to move the carton through the machine and leave the same stationary before the eduction-trough, a folding-vane moving at the same speed as the propeller, means for swinging the vane down upon the carton to fold one of the side flaps, means for retracting the propeller before the vane is removed from the carton, means for shifting the carton sidewise after the retraction of the frame but before the retraction of the vane, the carton passing into the eduction-trough and the remaining side flap coming into contact with the top thereof and being folded thereby.

19. In a device of the class described, the combination with mechanism for folding the front and rear flaps of a carton, mechanism for applying glue to the side flaps, a reciprocating propeller adapted to move the carton through the machine and leave the same stationary before the eduction-trough, a folding-vane moving at the same speed as the propeller, means for swinging the vane down upon the carton to fold one of the side flaps, means for retracting the propeller before the vane is removed from the carton, and a reciprocating plunger timed to move across the path of the carton after the retraction of the propeller and before the retraction of the vane and to shift the carton bodily sidewise into an eduction-trough, the remaining side flap coming in contact with the top of the eduction-trough and being folded thereby.

In witness whereof I have signed the above application for Letters Patent, at Chicago, in the county of Cook and State of Illinois, this 7th day of July, A. D. 1903.

CHARLIE REDD.

Witnesses:
S. BLISS,
MATTIE B. BLISS.